United States Patent
Rasmussen et al.

(10) Patent No.: US 11,925,147 B1
(45) Date of Patent: Mar. 12, 2024

(54) LANDSCAPING TARPAULIN

(71) Applicants: Jacob Rasmussen, Sherrills Ford, NC (US); Adam Boyd, Sherrills Ford, NC (US)

(72) Inventors: Jacob Rasmussen, Sherrills Ford, NC (US); Adam Boyd, Sherrills Ford, NC (US)

(*) Notice: Subject to any disclaimer, the term of this patent is extended or adjusted under 35 U.S.C. 154(b) by 0 days.

(21) Appl. No.: 17/830,868

(22) Filed: Jun. 2, 2022

(51) Int. Cl.
*A01G 20/43* (2018.01)
*B65F 1/00* (2006.01)

(52) U.S. Cl.
CPC .............. *A01G 20/43* (2018.02); *B65F 1/002* (2013.01); *B65F 2240/138* (2013.01)

(58) Field of Classification Search
CPC .... A01G 20/43; B65F 1/002; B65F 2240/138
USPC ...................................... 383/105, 4
See application file for complete search history.

(56) References Cited

U.S. PATENT DOCUMENTS

| | | | |
|---|---|---|---|
| 1,871,570 A * | 8/1932 | Weber | B63B 19/12 160/370.21 |
| 5,769,106 A * | 6/1998 | Achuff | A45F 4/02 135/97 |
| 7,552,956 B1 * | 6/2009 | Holloway | B65F 1/00 383/4 |
| 8,075,185 B2 | 12/2011 | Hecht | |
| 8,544,922 B1 | 10/2013 | Huzar | |
| 9,657,514 B1 | 5/2017 | Whittemore | |
| D806,488 S | 1/2018 | Cohen | |
| 10,604,303 B1 * | 3/2020 | Mataya | B65D 33/105 |
| 2007/0025646 A1 * | 2/2007 | Schoenig | A45C 13/002 383/4 |
| 2008/0050050 A1 | 2/2008 | Seecof | |
| 2013/0195383 A1 | 8/2013 | Daugs | |
| 2015/0374180 A1 | 12/2015 | Gallmon-Perry | |
| 2019/0210440 A1 | 7/2019 | Voles | |
| 2021/0051862 A1 * | 2/2021 | Sharkey | A01G 20/43 |

* cited by examiner

*Primary Examiner* — Jes F Pascua
(74) *Attorney, Agent, or Firm* — Kyle A. Fletcher, Esq.

(57) ABSTRACT

The landscaping tarpaulin is a collection device. The landscaping tarpaulin is configured for use in the collection of debris from the ground. The debris is placed on the landscaping tarpaulin. The landscaping tarpaulin forms a containment structure used to transport the debris for disposal. The landscaping tarpaulin comprises a tarpaulin structure, a plurality of magnets, a plurality of zippers, and a plurality of kick steps. The plurality of magnets, the plurality of zippers, and the plurality of kick steps attach to the tarpaulin structure. The plurality of magnets secure the corners of the tarpaulin structure together to form the containment structure of the tarpaulin structure. The plurality of zippers enclose the tarpaulin structure into a bag like containment structure. The plurality of kick steps form foot holds used to hold the tarpaulin structure in a fixed position as the debris is loaded onto the tarpaulin structure.

13 Claims, 5 Drawing Sheets

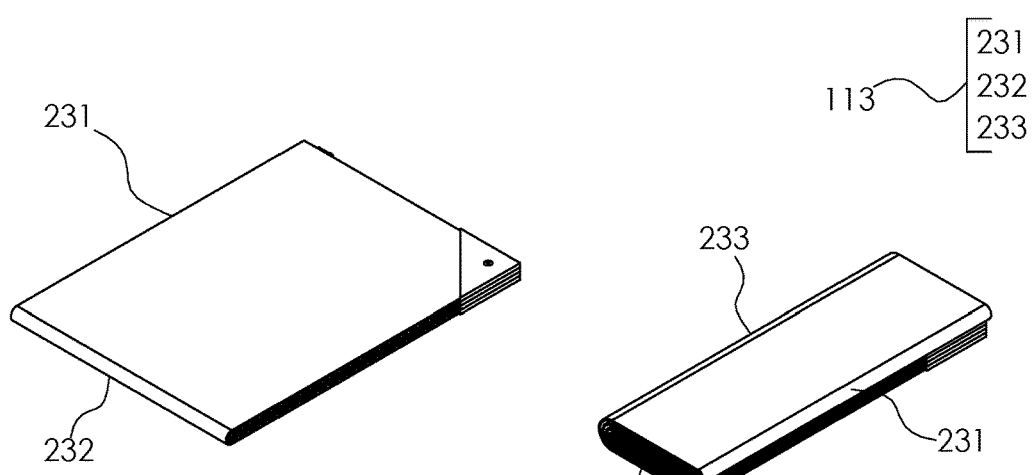
FIG. 3
FIG. 4
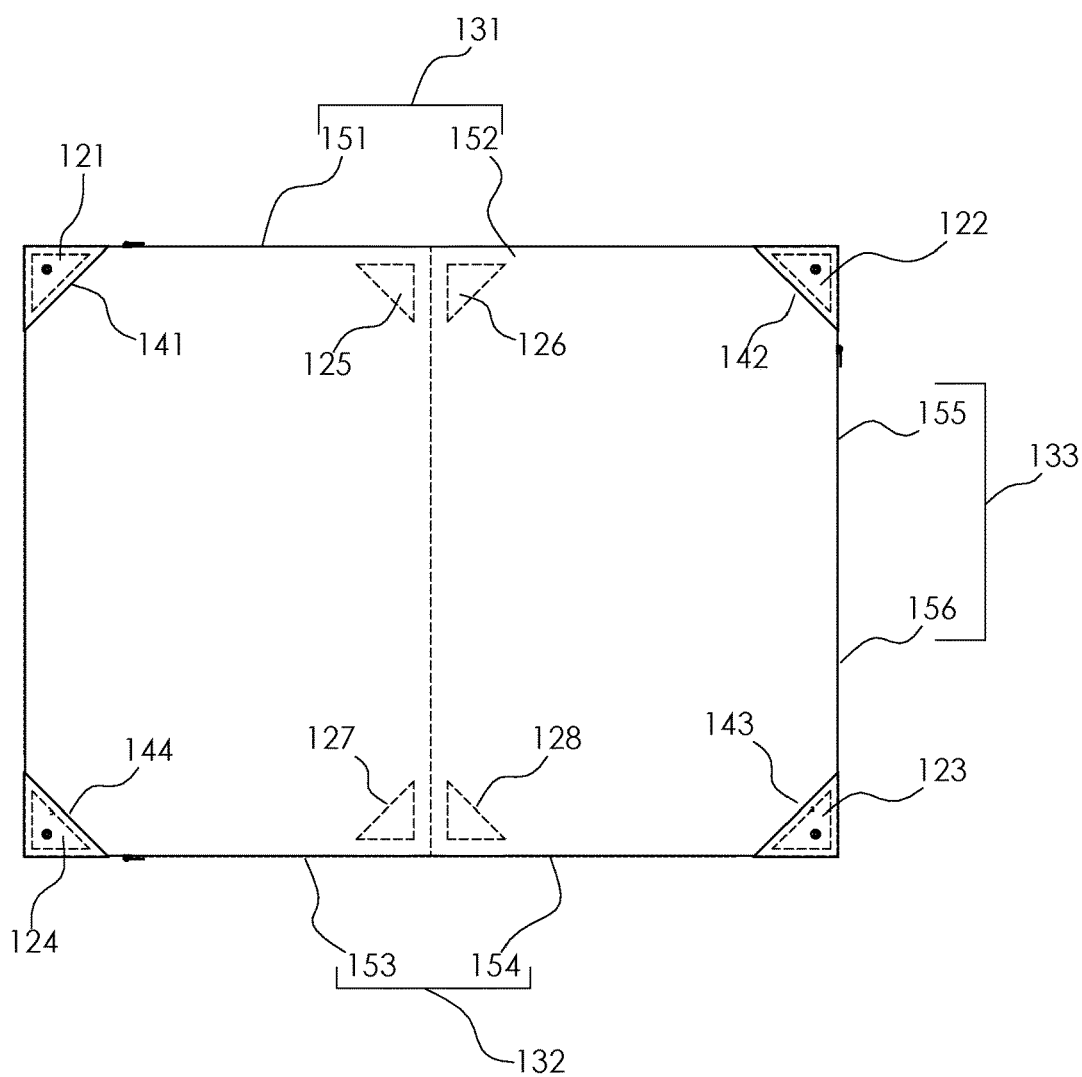
FIG. 5

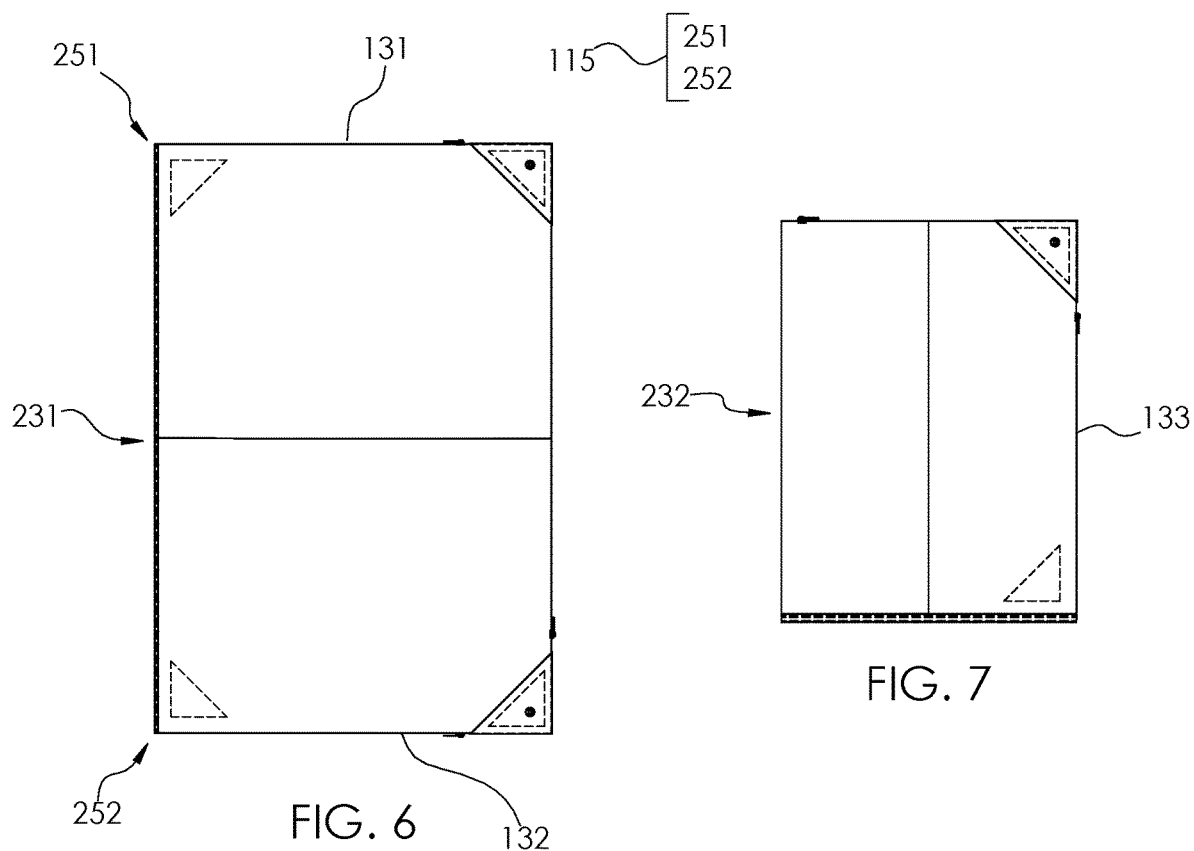
FIG. 6
FIG. 7
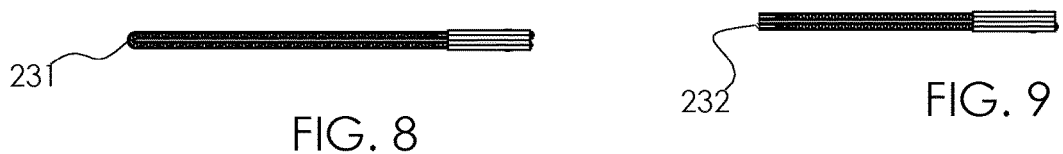
FIG. 8
FIG. 9
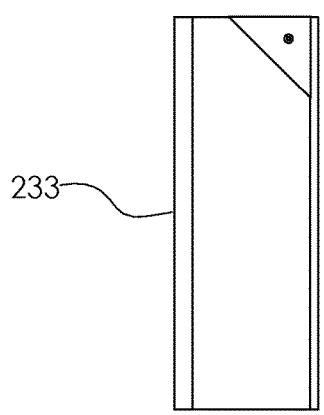
FIG. 10

LANDSCAPING TARPAULIN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of sheetings impervious to water. (E04B1/665)

SUMMARY OF INVENTION

The landscaping tarpaulin is a collection device. The landscaping tarpaulin is configured for use in the collection of debris from the ground. The debris is placed on the landscaping tarpaulin. The landscaping tarpaulin forms a containment structure used to transport the debris for disposal. The landscaping tarpaulin comprises a tarpaulin structure, a plurality of magnets, a plurality of zippers, and a plurality of kick steps. The plurality of magnets, the plurality of zippers, and the plurality of kick steps attach to the tarpaulin structure. The plurality of magnets secure the corners of the tarpaulin structure together to form the containment structure of the tarpaulin structure. The plurality of zippers enclose the tarpaulin structure into a bag like containment structure. The plurality of kick steps form foot holds used to hold the tarpaulin structure in a fixed position as the debris is loaded onto the tarpaulin structure.

These together with additional objects, features and advantages of the landscaping tarpaulin will be readily apparent to those of ordinary skill in the art upon reading the following detailed description of the presently preferred, but nonetheless illustrative, embodiments when taken in conjunction with the accompanying drawings.

In this respect, before explaining the current embodiments of the landscaping tarpaulin in detail, it is to be understood that the landscaping tarpaulin is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the landscaping tarpaulin.

It is therefore important that the claims be regarded as including such equivalent construction insofar as they do not depart from the spirit and scope of the landscaping tarpaulin. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 3 is a perspective view of an embodiment of the disclosure.

FIG. 4 is a perspective view of an embodiment of the disclosure.

FIG. 5 is a front view of an embodiment of the disclosure.

FIG. 6 is a front view of an embodiment of the disclosure.

FIG. 7 is a front view of an embodiment of the disclosure.

FIG. 8 is a side view of an embodiment of the disclosure.

FIG. 9 is a side view of an embodiment of the disclosure.

FIG. 10 is a front view of an embodiment of the disclosure.

FIG. 11 B is an in-use view of an embodiment of the disclosure.

FIG. 11 C is an in-use view of an embodiment of the disclosure.

FIG. 11 D is an in-use view of an embodiment of the disclosure.

FIG. 11 E is an in-use view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
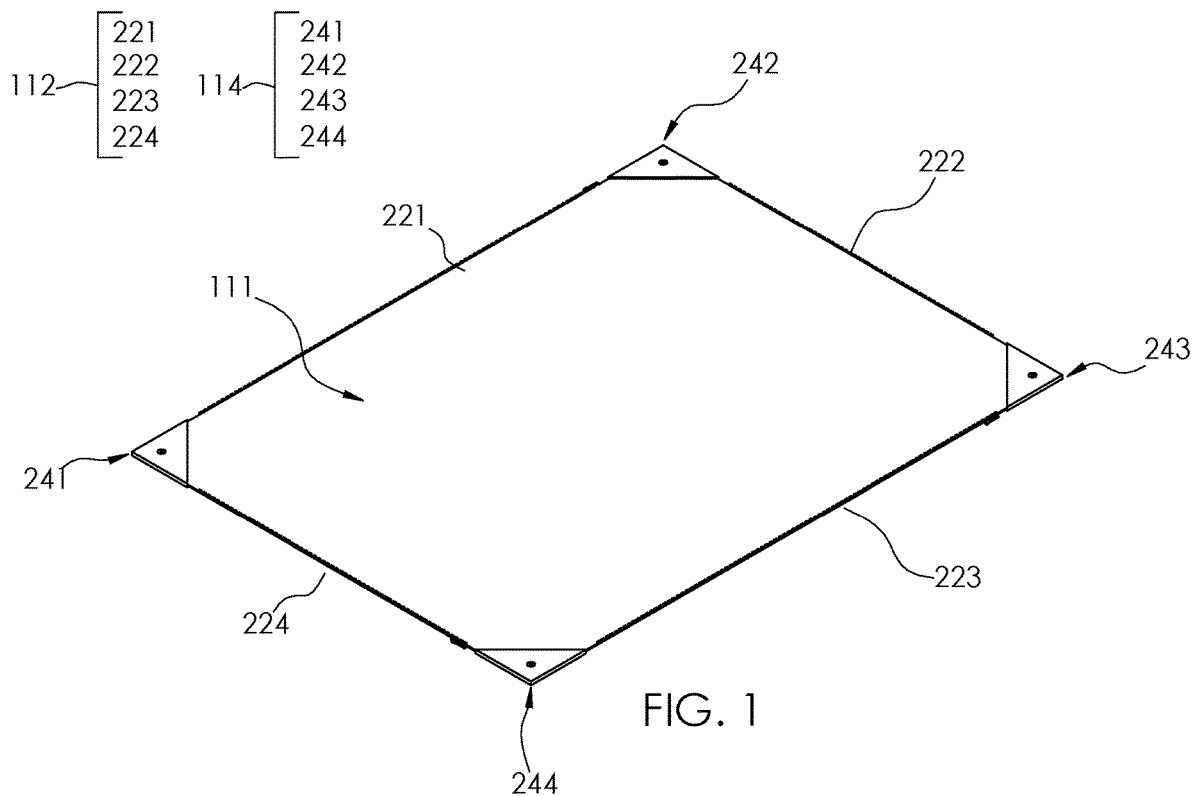
FIG. 1 is a perspective view of an embodiment of the disclosure.
Figure 2:
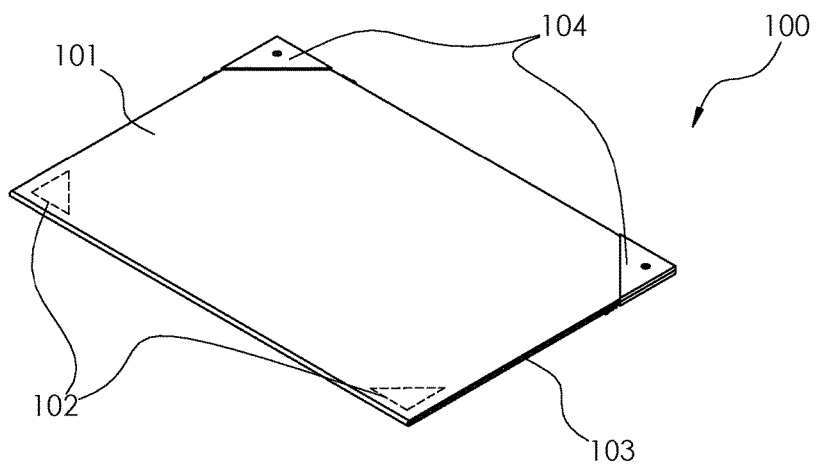
FIG. 2 is a perspective view of an embodiment of the disclosure.
Figure 11A:
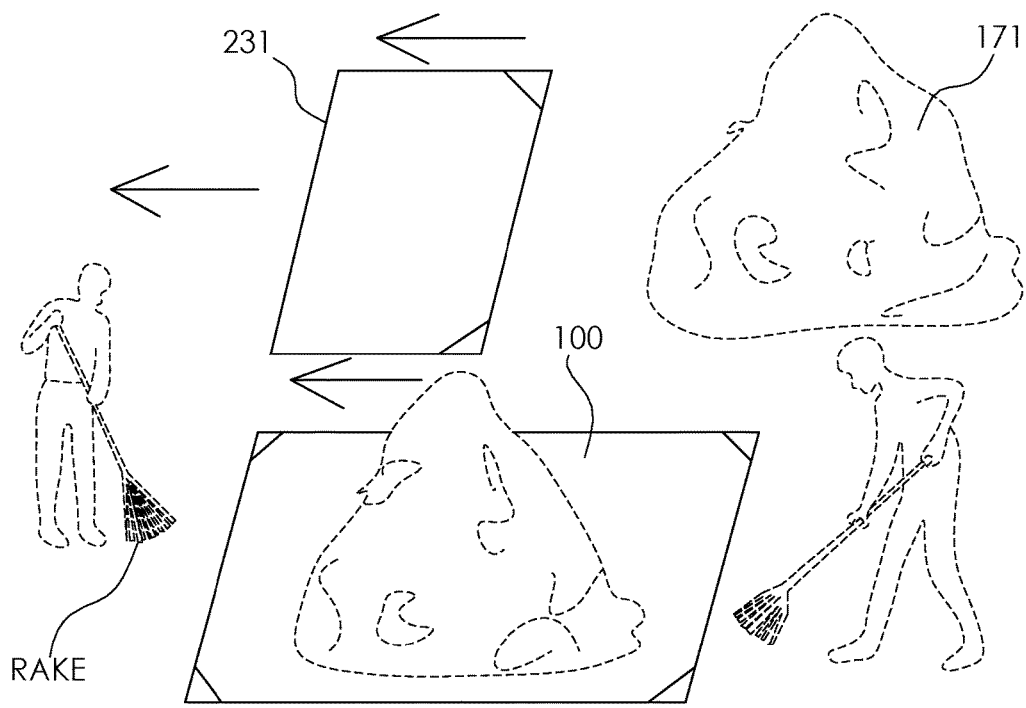
FIG. 11 A is an in-use view of an embodiment of the disclosure.
Figure 11B:
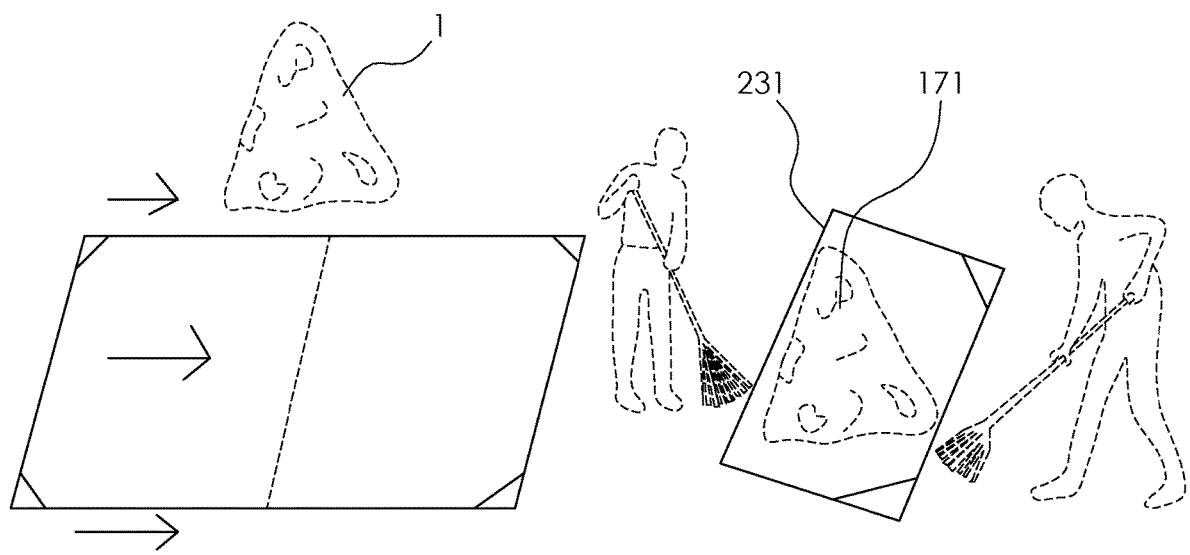
Figure 11C:
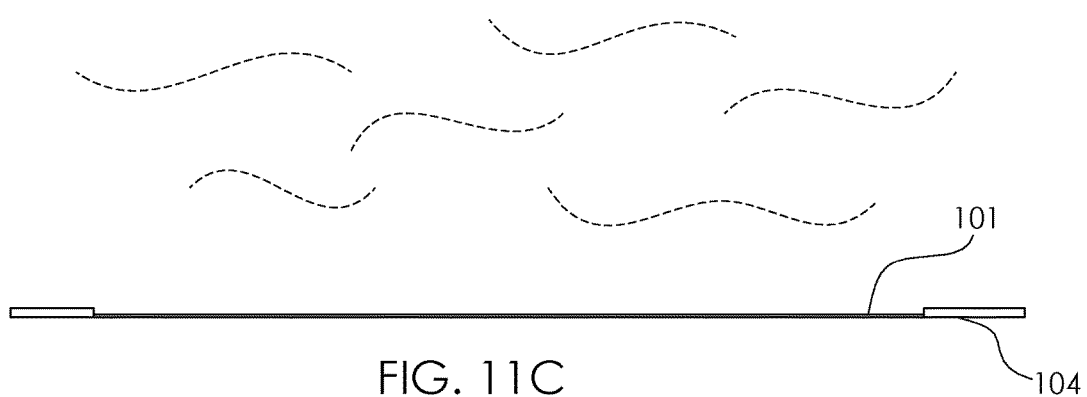
Figure 11D:
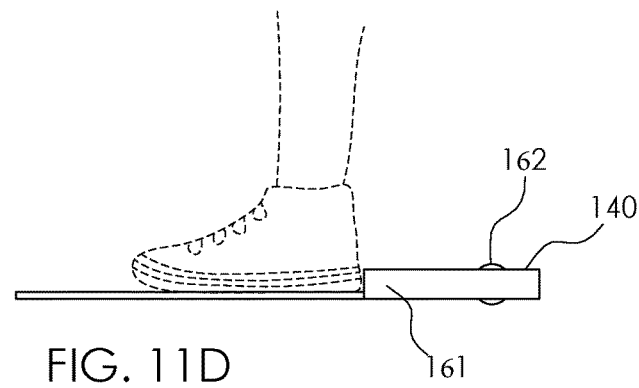
Figure 11E:
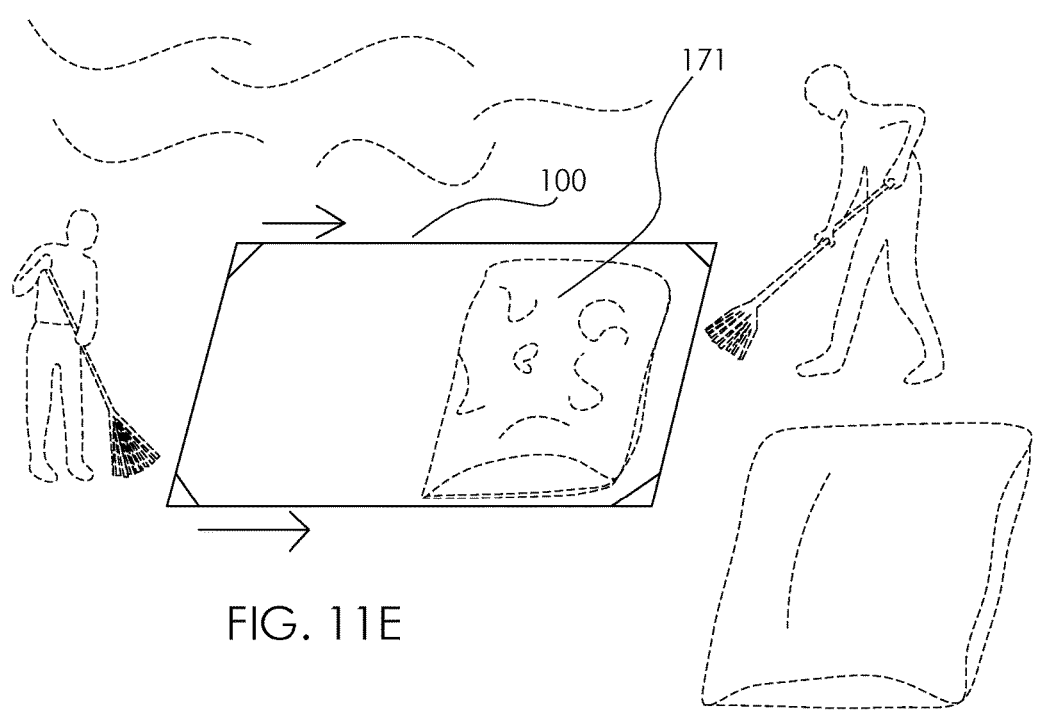

Detailed reference will now be made to one or more potential embodiments of the disclosure, which are illustrated in FIGS. 1 through 11.

The landscaping tarpaulin 100 (hereinafter invention) is a collection device. The invention 100 is configured for use in the collection of debris 171 from the ground. The debris 171 is placed on the invention 100. The invention 100 forms a containment structure used to transport the debris 171 for disposal. The invention 100 comprises a tarpaulin structure 101, a plurality of magnets 102, a plurality of zippers 103, and a plurality of kick steps 104. The plurality of magnets 102, the plurality of zippers 103, and the plurality of kick steps 104 attach to the tarpaulin structure 101. The plurality of magnets 102 secure the corners of the tarpaulin structure 101 together to form the containment structure of the tarpaulin structure 101. The plurality of zippers 103 enclose the tarpaulin structure 101 into a bag like containment structure.

The plurality of kick steps 104 form foot holds used to hold the tarpaulin structure 101 in a fixed position as the debris 171 is loaded onto the tarpaulin structure 101. Moreover, the plurality of kick steps 104 are used to spread out the tarpaulin structure 101 without the end user having to bend over.

The tarpaulin structure 101 is a sheeting structure. The tarpaulin structure 101 is formed as a textile. The tarpaulin structure 101 is a flexible structure. The tarpaulin structure 101 forms the physical structure used to capture and store the collected debris 171. More importantly, the tarpaulin structure 101 may be folded to form different shapes and sizes for use in landscaping. It shall be further noted that the tarpaulin structure 101 may be folded into an enclosable structure used to transport the debris 171 for disposal. The tarpaulin structure 101 is formed with a rectangular shape. The tarpaulin structure 101 comprises a textile structure 111, a plurality of edges 112, a plurality of folded edges 113, a plurality of corners 114, and a plurality of folded corners 115.

The textile structure 111 is a sheeting structure. The textile structure 111 is formed as a textile. The textile structure 111 forms the physical boundaries of the containment space used by the tarpaulin structure 101 to contain the debris 171. The textile structure 111 has a rectangular shape.

The plurality of edges 112 are the edges that form the perimeter of the rectangular shape of the textile structure 111. The plurality of edges 112 comprises a first edge 221, a second edge 222, a third edge 223, and a fourth edge 224. The first edge 221 is a first straight edge that forms the perimeter of the textile structure 111. The first edge 221 perpendicularly intersects with the fourth edge 224. The first edge 221 perpendicularly intersects with the second edge 222. The second edge 222 is a first straight edge that forms the perimeter of the textile structure 111. The second edge 222 perpendicularly intersects with the first edge 221. The second edge 222 perpendicularly intersects with the third edge 223. The third edge 223 is a first straight edge that forms the perimeter of the textile structure 111. The third edge 223 perpendicularly intersects with the second edge 222. The third edge 223 perpendicularly intersects with the fourth edge 224. The fourth edge 224 is a first straight edge that forms the perimeter of the textile structure 111. The fourth edge 224 perpendicularly intersects with the third edge 223. The fourth edge 224 perpendicularly intersects with the first edge 221.

Each corner selected from the plurality of corners 114 is a vertex that is formed at the point where an edge initially selected from the plurality of edges 112 intersects an adjacent edge selected from the plurality of edges 112. The plurality of corners 114 comprises a first corner 241, a second corner 242, a third corner 243, and a fourth corner 244. The first corner 241 is the vertex formed by the first edge 221 and the fourth edge 224. The second corner 242 is the vertex formed by the second edge 222 and the first edge 221. The third corner 243 is the vertex formed by the third edge 223 and the second edge 222. The fourth corner 244 is the vertex formed by the fourth edge 224 and the third edge 223.

Each folded edge selected from the plurality of folded edges 113 is an additional edge that is formed when the textile structure 111 is folded onto itself to enclose the debris 171. The plurality of folded edges 113 comprises a first folded edge 231, a second folded edge 232, and a third folded edge 233. Each folded corner selected from the plurality of folded corners 115 is an additional corner that is formed when the textile structure 111 is folded on itself regardless of the debris 171. The plurality of folded corners 115 comprises a first folded corner 251 and a second folded corner 252.

The first folded edge 231 is an additional edge that is formed in the textile structure 111 when the textile structure 111 is folded such that: a) the first corner 241 is overlaid and aligned with the second corner 242; while simultaneously, b) the fourth corner 244 is overlaid and aligned with the third corner 243. The first folded corner 251 is the additional vertex that is formed between the first folded edge 231 and the first edge 221 after the textile structure 111 has been folded to form the first folded edge 231. The second folded corner 252 is the additional vertex that is formed between the first folded edge 231 and the third edge 223 after the textile structure 111 has been folded to form the first folded edge 231.

The second folded edge 232 is an additional edge that is formed in the textile structure 111 when the textile structure 111 is folded such that: a) the second corner 242 is overlaid and aligned with the third corner 243; while simultaneously, b) the first folded corner 251 is overlaid and aligned with the second folded corner 252.

The third folded edge 233 is an additional edge that is formed in the textile structure 111 when the textile structure 111 is folded such that first folded edge 231 is overlaid and aligned with the second edge 222.

Each magnet selected from the plurality of magnets 102 is a magnet. Each magnet selected from the plurality of magnets 102 forms a fastening structure. Each magnet selected from the plurality of magnets 102 attaches to the tarpaulin structure 101. Any first magnet selected from the plurality of magnets 102 attaches to a second magnet selected from the plurality of magnets 102 to attach a first location of the tarpaulin structure 101 to a second location on the tarpaulin structure 101. The plurality of magnets 102 secures the tarpaulin structure 101 into a fixed shape as the tarpaulin structure 101 is folded. The plurality of magnets 102 forms the enclosed space within the tarpaulin structure 101 that is used to transport the debris 171. The plurality of magnets 102 comprises a first magnet 121, a second magnet 122, a third magnet 123, a fourth magnet 124, a fifth magnet 125, a sixth magnet 126, a seventh magnet 127, and an eighth magnet 128.

The first magnet 121 is a magnet selected from the plurality of magnets 102. The first magnet 121 permanently attaches to the textile structure 111 at the first corner 241. The first magnet 121 magnetically attaches to the second magnet 122 when the first corner 241 is overlaid and aligned with the second corner 242.

The second magnet 122 is a magnet selected from the plurality of magnets 102. The second magnet 122 permanently attaches to the textile structure 111 at the second corner 242. The second magnet 122 magnetically attaches to the first magnet 121 when the first corner 241 is overlaid and aligned with the second corner 242.

The third magnet 123 is a magnet selected from the plurality of magnets 102. The third magnet 123 permanently attaches to the textile structure 111 at the third corner 243. The third magnet 123 magnetically attaches to the fourth magnet 124 when the fourth corner 244 is overlaid and aligned with the third corner 243.

The fourth magnet 124 is a magnet selected from the plurality of magnets 102. The fourth magnet 124 permanently attaches to the textile structure 111 at the second corner 242. The fourth magnet 124 magnetically attaches to the third magnet 123 when the fourth corner 244 is overlaid and aligned with the third corner 243.

The fifth magnet 125 is a magnet selected from the plurality of magnets 102. The fifth magnet 125 permanently attaches to the textile structure 111 at the first folded corner 251. The fifth magnet 125 magnetically attaches to the sixth magnet 126 when the first folded edge 231 is formed in the textile structure 111.

The sixth magnet 126 is a magnet selected from the plurality of magnets 102. The sixth magnet 126 permanently attaches to the textile structure 111 at the first folded corner 251. The sixth magnet 126 magnetically attaches to the fifth magnet 125 when the first folded edge 231 is formed in the textile structure 111.

The seventh magnet 127 is a magnet selected from the plurality of magnets 102. The seventh magnet 127 permanently attaches to the textile structure 111 at the second folded corner 252. The seventh magnet 127 magnetically attaches to the eighth magnet 128 when the first folded edge 231 is formed in the textile structure 111.

The eighth magnet 128 is a magnet selected from the plurality of magnets 102. The eighth magnet 128 permanently attaches to the textile structure 111 at the second folded corner 252. The eighth magnet 128 magnetically attaches to the seventh magnet 127 when the first folded edge 231 is formed in the textile structure 111.

Each zipper selected from the plurality of zippers 103 is a fastening device. Each zipper selected from the plurality of zippers 103 attaches to the textile structure 111 of the tarpaulin structure 101. Each zipper selected from the plurality of zippers 103 secures an edge initially selected from the plurality of edges 112 to an edge selected from the group consisting of: a) the initially selected edge; and, b) a second edge selected from the plurality of edges 112. The plurality of zippers 103 enclose the storage space formed by the tarpaulin structure 101 that is used to contain the debris 171. The plurality of zippers 103 comprises a first zipper 131, a second zipper 132, and a third zipper 133.

The plurality of zippers 103 enables the tarpaulin structure 101 to be folded over, which reduces wind flow. The use of the plurality of zippers 103 on the tarpaulin structure 101 creates a secure folding system, which enables the tarpaulin to be neat, organized, and flat.

The first zipper 131 is a zipper selected from the plurality of zippers 103. The first zipper 131 attaches the first edge 221 to itself when the textile structure 111 is folded to form the first folded edge 231. The first zipper 131 encloses a portion of the storage space formed by the tarpaulin structure 101 that is used to contain the debris 171. The first zipper 131 further comprises a first chain tape 151 and a second chain tape 152.

The first chain tape 151 is a chain tape that forms a portion of the first zipper 131. The first chain tape 151 attaches to the first edge 221. The first chain tape 151 is located at a position between the first corner 241 and the second chain tape 152. The first chain tape 151 aligns with the second chain tape 152 when the textile structure 111 is folded to form the first folded edge 231. The second chain tape 152 is a chain tape that forms a portion of the first zipper 131. The second chain tape 152 attaches to the first edge 221. The second chain tape 152 is located at a position between the second corner 242 and the first chain tape 151. The second chain tape 152 aligns with the first chain tape 151 when the textile structure 111 is folded to form the first folded edge 231.

The second zipper 132 is a zipper selected from the plurality of zippers 103. The second zipper 132 attaches the third edge 223 to itself when the textile structure 111 is folded to form the first folded edge 231. The second zipper 132 encloses a portion of the storage space formed by the tarpaulin structure 101 that is used to contain the debris 171. The second zipper 132 further comprises a third chain tape 153 and a fourth chain tape 154.

The third chain tape 153 is a chain tape that forms a portion of the second zipper 132. The third chain tape 153 attaches to the third edge 223. The third chain tape 153 is located at a position between the fourth corner 244 and the fourth chain tape 154. The third chain tape 153 aligns with the fourth chain tape 154 when the textile structure 111 is folded to form the first folded edge 231. The fourth chain tape 154 is a chain tape that forms a portion of the second zipper 132. The fourth chain tape 154 attaches to the third edge 223. The fourth chain tape 154 is located at a position between the third corner 243 and the third chain tape 153. The fourth chain tape 154 aligns with the third chain tape 153 when the textile structure 111 is folded to form the first folded edge 231.

The third zipper 133 is a zipper selected from the plurality of zippers 103. The third zipper 133 attaches the second edge 222 to itself when the textile structure 111 is folded to form the second folded edge 232. The third zipper 133 encloses a portion of the storage space formed by the tarpaulin structure 101 that is used to contain the debris 171. The third zipper 133 further comprises a fifth chain tape 155 and a sixth chain tape 156.

The fifth chain tape 155 is a chain tape that forms a portion of the third zipper 133. The fifth chain tape 155 attaches to the second edge 222. The fifth chain tape 155 is located at a position between the second corner 242 and the sixth chain tape 156. The fifth chain tape 155 aligns with the sixth chain tape 156 when the textile structure 111 is folded to form the second folded edge 232. The sixth chain tape 156 is a chain tape that forms a portion of the third zipper 133. The sixth chain tape 156 attaches to the second edge 222. The sixth chain tape 156 is located at a position between the third corner 243 and the fifth chain tape 155. The sixth chain tape 156 aligns with the fifth chain tape 155 when the textile structure 111 is folded to form the second folded edge 232.

Each individual kick step 140 selected from the plurality of kick steps 104 is a rigid structure. Each individual kick step 140 is a disk shaped structure. Each individual kick step 140 is a foothold. Each individual kick step 140 is designed to be manipulated by the foot of a user such that the tarpaulin structure 101 can be dragged into a new fixed loading position without the use of the hands of the end user, and also the tarpaulin structure 101 is held in a fixed position during the loading of the debris 171 onto the tarpaulin structure 101. Each individual kick step 140 attaches to the textile structure 111 of the tarpaulin structure 101. The plurality of kick steps 104 comprises a collection of individual kick steps 140.

Each individual kick step 140 further comprises a kick step disk 161 and a kick step double grommet 162. The kick step disk 161 is a rigid structure. The kick step disk 161 is a disk shaped structure. The kick step disk 161 permanently attaches to the textile structure 111. The kick step disk 161 forms the foothold used to hold the textile structure 111 in a fixed position. The kick step double grommet 162 forms a grommet that is used to secure the textile structure 111 to the kick step disk 161. The kick step double grommet 162 is a reinforced structure that ensures that the individual kick step 140 will not damage the tarpaulin structure 101 during the use of the individual kick step 140.

In the first potential embodiment of the disclosure, the plurality of kick steps 104 further comprises a first kick step 141, a second kick step 142, a third kick step 143, and a fourth kick step 144. The first kick step 141 is an individual kick step 140 selected from the plurality of kick steps 104. The first kick step 141 permanently attaches to the textile structure 111 at the first corner 241. The second kick step 142 is an individual kick step 140 selected from the plurality of kick steps 104. The second kick step 142 permanently attaches to the textile structure 111 at the second corner 242. The third kick step 143 is an individual kick step 140 selected from the plurality of kick steps 104. The third kick step 143 permanently attaches to the textile structure 111 at the third corner 243. The fourth kick step 144 is an individual kick step 140 selected from the plurality of kick steps 104. The fourth kick step 144 permanently attaches to the textile structure 111 at the fourth corner 244.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Composite Textile: As used in this disclosure, a composite textile is a multilayer fabric made of two or more joined layers of textile or sheeting materials.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container. Use protected space or protection space.

Correspond: As used in this disclosure, the term correspond is used as a comparison between two or more objects wherein one or more properties shared by the two or more objects match, agree, or align within acceptable manufacturing tolerances.

Debris: As used in this disclosure, debris refers to an accumulation of loose and unwanted material on a surface.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Fastener: As used in this disclosure, a fastener is a device that is used to join or affix two objects. Fasteners generally comprise a first element which is attached to the first object and a second element which is attached to the second object such that the first element and the second element join to removably attach the first object and the second object. Common fasteners include, but are not limited to, hooks, zippers, magnets, snaps, buttons, buckles, quick release buckles, or hook and loop fasteners. A fastener is often referred to as a fastening device.

Flexible: As used in this disclosure, flexible refers to an object or material that will deform when a force is applied to it but that will not necessarily return to its original shape when the deforming force is removed.

Fold: As used in this disclosure, to fold means to bend an object back upon itself.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grommet: As used in this disclosure, a grommet is an eyelet placed in a hole in a textile, sheet, or panel that protects a rope hook or cable passed through it and to protect the textile, sheet, or panel from being torn. See bushing and flange.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field. A magnet is further defined with a north pole and a south pole. By aligning with an external magnetic field is meant that the north-south pole structure of a first magnet will align with the north south pole of a second magnet. The pole of any first magnet will attract the opposite pole of any second magnet (i.e. a north pole will attract a south pole).

Magnetic Material: As used in this disclosure, a magnetic material is a substance that attracts or is attracted to a magnet but that itself has no net magnetic moment (beyond any residual moment created by prior use). Common classes of magnetic materials include ferromagnetic, diamagnetic, paramagnetic, ferrimagnetic and antiferromagnetic.

Mass: As used in this disclosure, refers to a quantity of matter within a structure. Mass is measured and quantified by the reaction of the structure to a force. Mass can also be roughly quantified as a function of atomic composition and the number of atoms contained within the structure. The term weight refers to the quantification of a mass that is exposed to the force of gravity.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rectangle: As used in this disclosure, a rectangle is an enclosed four sided geometric structure. Each angle formed by the rectangle is a right angle. A non-Euclidean rectangle is a rectangle that is formed on a non-Euclidean plane.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tarpaulin: As used in this disclosure, a tarpaulin is a protective covering made of a sheeting. The sheeting can be a textile material made from made from fibers or yarns suitable for textile production methods including, but not limited to, weaving, knitting, or felting. The sheeting can also be made of material in the form of a continuous film including, but not limited to, plastic films and metal foils.

Textile: As used in this disclosure, a textile is a material that is woven, knitted, braided, or felted. Synonyms in common usage for this definition include fabric and cloth. The two surfaces of the textile with the greatest surface area are called the faces of the textile.

Vertex: As used in this disclosure, a vertex (plural vertices) is an angle that is formed by two lines that form a point. Vertices are commonly found in polygons.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Zipper: As used in this disclosure, a zipper is a fastening device comprising a first chain tape, a second chain tape, and a zipper pull. The first chain tape and the second chain tape are textile webbings formed with interlocking components that form a chain. The chain is opened and closed by pulling a slide, called a zipper pull, over the first chain tape, a second chain tape. The individual elements of the chain are called the teeth of the chain.

With respect to the above description, it is to be realized that the optimum dimensional relationship for the various components of the invention described above and in FIGS. 1 through 11E include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

We claim:

1. A landscaping tarpaulin comprising
a tarpaulin structure, a plurality of magnets, a plurality of zippers, and a plurality of kick steps;
wherein the plurality of magnets, the plurality of zippers, and the plurality of kick steps attach to the tarpaulin structure;
wherein the landscaping tarpaulin is folded to form different shapes and sizes for use in landscaping;
wherein the plurality of kick steps are configured to form foot holds used to hold the tarpaulin structure in a fixed position as debris is loaded onto the tarpaulin structure from the ground;
wherein the textile structure forms physical boundaries of a containment space used by the tarpaulin structure to contain the debris;
wherein the textile structure has a rectangular shape;
wherein the plurality of edges are the edges that form the perimeter of the rectangular shape of the textile structure;
wherein the plurality of kick steps comprises a collection of individual kick steps;
wherein each individual kick step further comprises a kick step disk and a kick step double grommet;
wherein the kick step disk forms the foothold used to hold the textile structure in a fixed position;
wherein each individual kick step has a raised surface that is adapted to interface with a foot of an end user in order to stabilize the landscaping tarpaulin;
wherein the plurality of kick steps are positioned within the perimeter of the textile structure;
wherein the plurality of kick steps are co-planar with a bottom of the tarpaulin structure;
wherein each folded edge selected from the plurality of folded edges is an additional edge that is formed when the textile structure is folded onto itself to enclose the debris;
wherein the plurality of folded edges comprises a first folded edge, a second folded edge, and a third folded edge;
wherein the first folded edge is an additional edge that is formed in the textile structure when the textile structure is folded such that: a) the first corner is overlaid and aligned with the second corner; while simultaneously, b) the fourth corner is overlaid and aligned with the third corner;
wherein the second folded edge is an additional edge that is formed in the textile structure when the textile structure is folded such that: a) the second corner is overlaid and aligned with the third corner; while simultaneously, b) the first folded corner is overlaid and aligned with the second folded corner;
wherein the third folded edge is an additional edge that is formed in the textile structure when the textile structure is folded such that first folded edge is overlaid and aligned with the second edge.

2. The landscaping tarpaulin according to claim 1
wherein the landscaping tarpaulin is configured to form the containment space used to transport the debris for disposal;
wherein the plurality of magnets secure the corners of the tarpaulin structure together to form the containment structure of the tarpaulin structure;
wherein the plurality of zippers enclose the tarpaulin structure into a bag like containment structure.

3. The landscaping tarpaulin according to claim 2
wherein the tarpaulin structure is a sheeting structure;
wherein the tarpaulin structure is formed as a textile;
wherein the tarpaulin structure forms the physical structure used to capture and store the collected debris;
wherein the tarpaulin structure is a flexible structure;
wherein the tarpaulin structure folds into different shapes and sizes;
wherein the tarpaulin structure is formed with a rectangular shape.

4. The landscaping tarpaulin according to claim 3
wherein the tarpaulin structure folds into an enclosable structure used to transport the debris for disposal;
wherein each magnet selected from the plurality of magnets is a magnet;
wherein each magnet selected from the plurality of magnets forms a fastening structure;
wherein each magnet selected from the plurality of magnets attaches to the tarpaulin structure;
wherein any first magnet selected from the plurality of magnets attaches to a second magnet selected from the plurality of magnets to attach a first location of the tarpaulin structure to a second location on the tarpaulin structure;

wherein the plurality of magnets secures the tarpaulin structure into a fixed shape as the tarpaulin structure is folded;

wherein the plurality of magnets forms the enclosed space within the tarpaulin structure that is used to transport the debris.

5. The landscaping tarpaulin according to claim 4 wherein each zipper selected from the plurality of zippers is a fastening device;

wherein each zipper selected from the plurality of zippers attaches to the textile structure of the tarpaulin structure;

wherein each zipper selected from the plurality of zippers secures an edge initially selected from the plurality of edges to an edge selected from the group consisting of: a) the initially selected edge; and, b) a second edge selected from the plurality of edges;

wherein the plurality of zippers enclose the storage space formed by the tarpaulin structure that is used to contain the debris.

6. The landscaping tarpaulin according to claim 5 wherein each individual kick step selected from the plurality of kick steps is a rigid structure;

wherein each individual kick step is a disk shaped structure;

wherein each individual kick step is a foothold;

wherein each individual kick step is designed to be manipulated by the foot of a user such that the tarpaulin structure can be held in a fixed position during the loading of the debris onto the tarpaulin structure;

wherein each individual kick step attaches to the textile structure of the tarpaulin structure.

7. The landscaping tarpaulin according to claim 6 wherein the tarpaulin structure comprises a textile structure, a plurality of edges, a plurality of folded edges, a plurality of corners, and a plurality of folded corners;

wherein the textile structure is a sheeting structure;

wherein the textile structure is formed as a textile.

8. The landscaping tarpaulin according to claim 7 wherein the plurality of edges comprises a first edge, a second edge, a third edge, and a fourth edge;

wherein the first edge is a first straight edge that forms the perimeter of the textile structure;

wherein the first edge perpendicularly intersects with the fourth edge;

wherein the first edge perpendicularly intersects with the second edge;

wherein the second edge is a first straight edge that forms the perimeter of the textile structure;

wherein the second edge perpendicularly intersects with the first edge;

wherein the second edge perpendicularly intersects with the third edge;

wherein the third edge is a first straight edge that forms the perimeter of the textile structure;

wherein the third edge perpendicularly intersects with the second edge;

wherein the third edge perpendicularly intersects with the fourth edge;

wherein the fourth edge is a first straight edge that forms the perimeter of the textile structure;

wherein the fourth edge perpendicularly intersects with the third edge;

wherein the fourth edge perpendicularly intersects with the first edge.

9. The landscaping tarpaulin according to claim 8 wherein each corner selected from the plurality of corners is a vertex that is formed at the point where an edge initially selected from the plurality of edges intersects an adjacent edge selected from the plurality of edges;

wherein the plurality of corners comprises a first corner, a second corner, a third corner, and a fourth corner;

wherein the first corner is the vertex formed by the first edge and the fourth edge;

wherein the second corner is the vertex formed by the second edge and the first edge;

wherein the third corner is the vertex formed by the third edge and the second edge;

wherein the fourth corner is the vertex formed by the fourth edge and the third edge.

10. The landscaping tarpaulin according to claim 9 wherein each folded corner selected from the plurality of folded corners is an additional corner that is formed when the textile structure is folded on itself to contain the debris;

wherein the plurality of folded corners comprises a first folded corner and a second folded corner;

wherein the first folded corner is the additional vertex that is formed between the first folded edge and the first edge after the textile structure has been folded to form the first folded edge;

wherein the second folded corner is the additional vertex that is formed between the first folded edge and the third edge after the textile structure has been folded to form the first folded edge.

11. The landscaping tarpaulin according to claim 10 wherein the plurality of magnets comprises a first magnet, a second magnet, a third magnet, a fourth magnet, a fifth magnet, a sixth magnet, a seventh magnet, and an eighth magnet;

wherein the first magnet is a magnet selected from the plurality of magnets;

wherein the first magnet permanently attaches to the textile structure at the first corner;

wherein the first magnet magnetically attaches to the second magnet when the first corner is overlaid and aligned with the second corner;

wherein the second magnet is a magnet selected from the plurality of magnets;

wherein the second magnet permanently attaches to the textile structure at the second corner;

wherein the second magnet magnetically attaches to the first magnet when the first corner is overlaid and aligned with the second corner;

wherein the third magnet is a magnet selected from the plurality of magnets;

wherein the third magnet permanently attaches to the textile structure at the third corner;

wherein the third magnet magnetically attaches to the fourth magnet when the fourth corner is overlaid and aligned with the third corner;

wherein the fourth magnet is a magnet selected from the plurality of magnets;

wherein the fourth magnet permanently attaches to the textile structure at the second corner;

wherein the fourth magnet magnetically attaches to the third magnet when the fourth corner is overlaid and aligned with the third corner;

wherein the fifth magnet is a magnet selected from the plurality of magnets;

wherein the fifth magnet permanently attaches to the textile structure at the first folded corner;

wherein the fifth magnet magnetically attaches to the sixth magnet when the first folded edge is formed in the textile structure;
wherein the sixth magnet is a magnet selected from the plurality of magnets;
wherein the sixth magnet permanently attaches to the textile structure at the first folded corner;
wherein the sixth magnet magnetically attaches to the fifth magnet when the first folded edge is formed in the textile structure;
wherein the seventh magnet is a magnet selected from the plurality of magnets;
wherein the seventh magnet permanently attaches to the textile structure at the second folded corner;
wherein the seventh magnet magnetically attaches to the eighth magnet when the first folded edge is formed in the textile structure;
wherein the eighth magnet is a magnet selected from the plurality of magnets;
wherein the eighth magnet permanently attaches to the textile structure at the second folded corner;
wherein the eighth magnet magnetically attaches to the seventh magnet when the first folded edge is formed in the textile structure.

12. The landscaping tarpaulin according to claim 11
wherein the plurality of zippers comprises a first zipper, a second zipper, and a third zipper;
wherein the first zipper attaches the first edge to itself when the textile structure is folded to form the first folded edge;
wherein the first zipper encloses a portion of the storage space formed by the tarpaulin structure that is used to contain the debris;
wherein the second zipper attaches the third edge to itself when the textile structure is folded to form the first folded edge;
wherein the second zipper encloses a portion of the storage space formed by the tarpaulin structure that is used to contain the debris;
wherein the third zipper attaches the second edge to itself when the textile structure is folded to form the second folded edge;
wherein the third zipper encloses a portion of the storage space formed by the tarpaulin structure that is used to contain the debris.

13. The landscaping tarpaulin according to claim 12
wherein the kick step disk is a rigid structure;
wherein the kick step disk is a disk shaped structure;
wherein the kick step disk permanently attaches to the textile structure;
wherein the kick step double grommet forms a grommet that is used to secure the textile structure to the kick step disk;
wherein the kick step double grommet is a reinforced structure that ensures that the individual kick step will not damage the tarpaulin structure during the use of the individual kick step.

\* \* \* \* \*